United States Patent [19]

Price et al.

[11] 4,062,434

[45] Dec. 13, 1977

[54] DORMER DOOR SILO

[75] Inventors: Raymond R. Price; Lawrence A. Olejniczak; Roger V. Olejniczak, all of Rochester, Minn.

[73] Assignee: Rochester Silo, Inc., Rochester, Minn.

[21] Appl. No.: 721,561

[22] Filed: Sept. 8, 1976

[51] Int. Cl.² .................. B65G 65/36; E04H 7/22
[52] U.S. Cl. .................................. 193/34; 52/195; 52/196
[58] Field of Search .............. 193/4, 5, 29, 33, 34; 52/195, 196

[56] References Cited

U.S. PATENT DOCUMENTS

| 1,184,385 | 5/1916 | Schafly | 193/34 X |
| 1,194,150 | 8/1916 | Dickson et al. | 193/34 X |
| 1,560,713 | 11/1925 | Nelson | 52/195 X |
| 1,739,534 | 12/1929 | Wilkinson | 193/34 |
| 3,709,345 | 1/1973 | Price | 193/34 |
| 3,797,625 | 3/1974 | Price | 193/34 |

Primary Examiner—John J. Love
Assistant Examiner—James L. Rowland
Attorney, Agent, or Firm—Williamson, Bains, Moore & Hansen

[57] ABSTRACT

An agricultural silo comprising a plurality of vertically spaced apart silage discharge orifices includes a twin passageway chute overlying the orifices. The chute includes a first passageway permitting unobstructed operator access and a separate silage discharge passageway which confines the silage during the unloading operation. A dormer door provided in the silo top may be opened to discharge silage therethrough. When opened the door vents the silo and, when closed, the door prevents material from entering the climbing and discharge chute during silo filling and prevents updrafts in the chute during unloading.

4 Claims, 3 Drawing Figures

DORMER DOOR SILO

BACKGROUND OF THE INVENTION

This invention relates generally to agricultural silos. More particularly, the instant invention relates to silo construction characterized by a dormer door for minimizing unwanted air currents in the silage unloader chute and for preventing material from entering the chute during a silo loading operation.

As will be recognized by those skilled in the art, modern silos normally include a plurality of vertically spaced apart silage discharge openings defined in a wall thereof and an elongated, generally tubular silage discharge chute which abuts the silo and overlies the openings. In silos wherein a single passage chute is employed the interior of the chute becomes dirty and grimy during the unloading operation. When the ladder rungs within the silo chute become grimy or slippery it can be difficult and inconvenient for the farmer to move within the chute. In order to remedy problems of this nature, silage chutes have been divided into separate access and silage discharge passageways. For example, in U.S. Pat. No. 3,709,345, issued Jan. 9, 1973, to the same assignee of the invention disclosed herein the silage discharge chute is divided into an inner, access passageway and an outer silage discharge passageway which receives forage outputted from the silo. A plurality of door panels engagable to direct ensilage into the output passageway prevents contamination of the access passageway. In U.S. Pat. No. 3,797,625, issued Mar. 19, 1974, the silage is contained within a separate discharge pipe housed within the access passageway to prevent contamination of same. Thus, with twin passage discharge chutes of the type described, silage being discharged from the silo is prevented from contaminating the interior of the access passageway.

As silage is discharged from the silo it will be directed downwardly through the chute's silage discharge passageway and out of the chute into a usually horizontally oriented silage handling device. Often an upward chimney draft will draw chaff and dust into the chute during unloading. When closed, the dormer door will alleviate "chimney effect" draft problems of this nature. Thus, when employed in combination with a twin passageway silage discharge chute of the character described previously, the dormer door will help to maintain the cleanliness of the access chute passageway.

SUMMARY OF THE INVENTION

The instant invention comprises a silo equipped with dormer door apparatus to facilitate selective flow communication between the interior of the silo and the silage discharge chute.

In a preferred embodiment the silo is provided with a dormer door at an upper portion thereof which may be selectively opened by the operator to enable fluid flow communication between the upper silo interior and the silage discharge chute. The discharge chute includes an access passageway for permitting unobstructed access by the operator and a separate, isolated passageway for transmitting discharged silage, as discussed in the previously cited patent references. As silage is continuously outputted from the silo, air currents may tend to flow through the access passageway, rather than upwardly through the discharge passageway if there is an open dormer. In this manner silage discharged downwardly through the chute discharge passageway will not be greatly affected by opposing air currents flowing upwardly therein. However such updrafts in the access passage could undesirably carry chaff upwardly in the access passage due to "chimney effects" during unloading. Accordingly the dormer door is normally utilized to block the dormer opening and prevent updrafts during unloading.

The dormer door may be opened or closed as desired by the operator through the manipulation of a rope and pulley linkage system which is conveniently accessible on the opposite side of the dormer door through the clean access chute. The door may be opened to discharge silage from the upper part of the silo when the silo is fully loaded. As silage level decreases silage will be outputted through lower silage discharge orifices, and the dormer door will be closed to minimize the "chimney effect." When an empty silo is being filled the dormer door can be closed to prevent unwanted spillage or leakage of silage into the access passage of the chute.

Thus an important object of this invention is to remedy the hitherto deleterious effects of air currents occurring within prior art discharge chutes during silage unloading.

More particularly, an object of this invention is to provide a practicable means for neutralizing the "chimney effect" which can occur during unloading of a silo.

A still further object of this invention is to provide a system for selectively blocking the discharge chute during silo filling.

Another object of this invention is to provide a silo with a dormer door which may be selectively actuated by the operator through means conveniently accessible from the discharge chute interior.

Still another object of this invention is to provide a dormer door which may be mounted on a plurality of silos of conventional construction.

A still further object of this invention is to provide a dormer door of the character described which is ideally adapted for use with double passageway silo chutes.

These and other objects and advantages of this invention, along with features of novelty appurtenant thereto, will appear or become apparent in the course of the following detailed description.

BRIEF DESCRIPTION OF THE DRAWINGS

In the following drawings, which form a part of the specification and are to be construed in conjunction therewith, and in which like reference numerals have been employed throughout to indicate like parts in the various views.

DETAILED DESCRIPTION OF THE DRAWINGS

Figures 1, 2, 3:
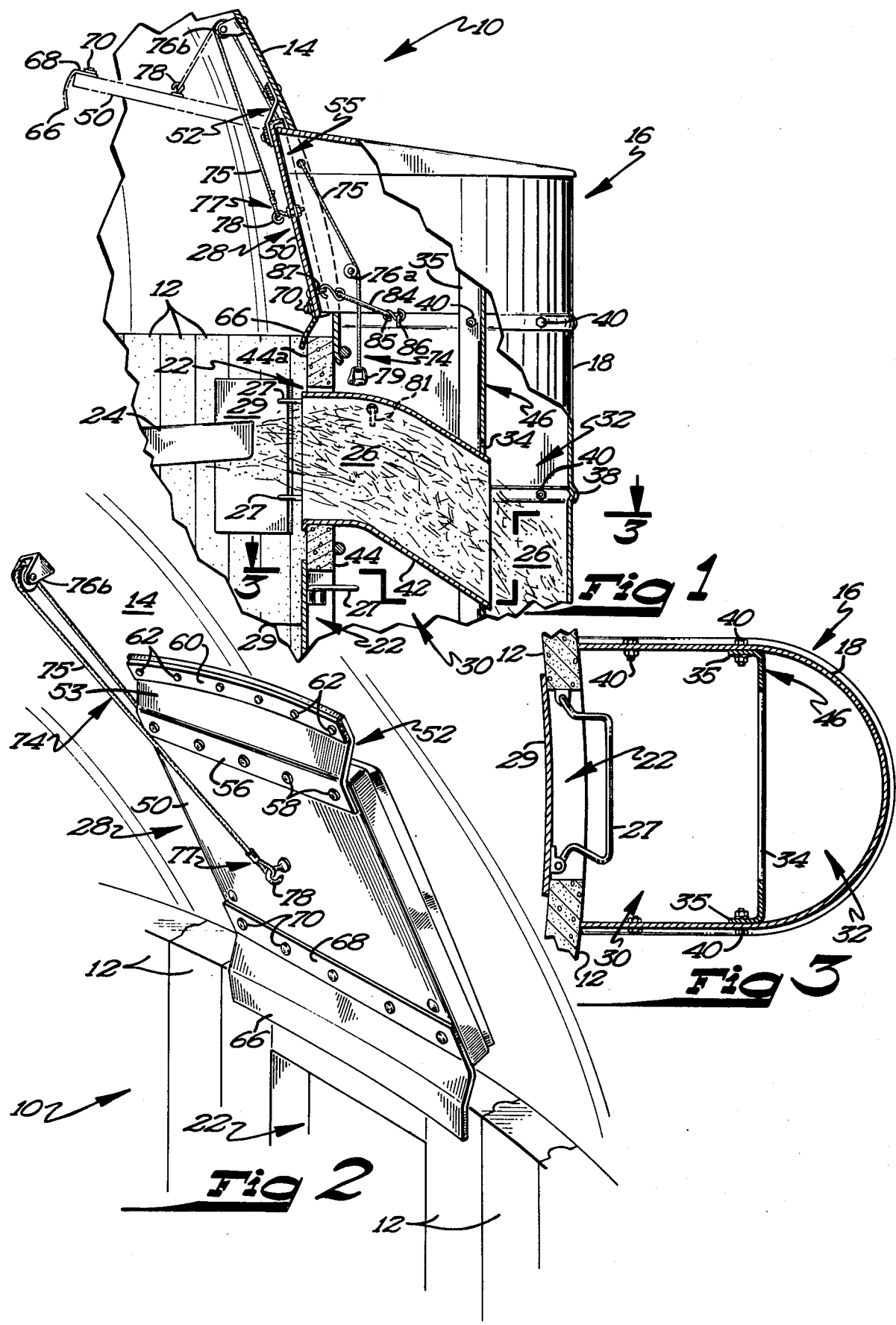
FIG. 1 is a perspective view of a silo constructed in accordance with the teachings of this invention, with parts thereof broken away or shown in section for clarity.
FIG. 2 is an enlarged, perspective view of the dormer door apparatus taken from the interior of the silo.
FIG. 3 is a sectional view of the apparatus taken generally through line 3—3 in FIG. 1.

Referring now to the drawings, a silo 10 of generally vertically upright, tubular configuration is thereshown. The silo may be comprised of a plurality of conventional staves 12 of tongue and groove construction arranged as will be recognized by those skilled in the art. Silo 10 comprises an upper dome 14 of preferably metallic construction, and an elongated chute 16, which extends vertically upwardly along the side of the silo in overlying, surrounding relationship with respect to a plurality of vertically spaced apart silage discharge orifices 22 defined in the wall of the silo. In FIG. 1 there is illustrated a chute portion 24 of a conventional rotatable silo unloader employed to automatically discharge silage 26 into the discharge chute 16 through one of the discharge orifices 22. Dormer door apparatus 28 located at an upper location within silo 10 above the uppermost discharge orifice 22 may be either opened or closed as desired by the operator, as will later be discussed. Each silage discharge orifice door 29 must be opened prior to discharge of silage through orifices 22.

Chute 16 is preferably of dual passageway construction, comprising an access passageway 30 and a separate silage discharge passageway 32. Divider wall 34 within chute 16 separates same to define the two passageways 30 and 32. Wall 34 includes a right-angled portion 35 which is rigidly attached to the chute braces 38 by bolts 40. During the unloading process a hood 42 which is coupled to dividing wall 34 is deployed to isolate and conduct silage from the discharge orifices 22 to similar orifices provided in partition 34. In this manner silage directed outwardly from discharge orifice 22 will pass into discharge chute passageway 32 through an orifice 46 provided in the partition wall 34. It will thus be apparent that as silage is discharged, access passageway 30 will remain clean and free from the silage 26 being outputted from the apparatus. Thus ladder rungs 27, which provide access for the operator, will remain clean and free from contamination. Chute 16, including the separate access and discharge passageways, may be constructed in accordance with the teachings of U.S. Pat. Nos. 3,709,345, issued Jan. 9, 1973, and/or U.S. Pat. No. 3,797,625, issued Mar. 19, 1974, both owned by the same assignee as in the instant case. The aforementioned patent references are relied upon and specifically incorporated by reference to show the detailed construction of the chute portion 16 also employed herein. As will be recognized by those skilled in the art, as the silage level within silo 10 continuously decreases during unloading, a chimney effect will often occur, resulting in air currents or updrafts.

The dormer door apparatus 28 (FIGS. 1 and 2) is provided to help control turbulent air currents, and is preferably located at an upper location within the silo. The dormer door apparatus preferably comprises a generally planar slab portion 50 of metallic construction which is pivotally mounted at an upper inside surface of dome or roof 14 by a hinge structure 52, comprised of first and second flexible sheets 53 and 54 disposed along opposite sides of the slab and secured thereto by rigid, elongated strips 56 which are attached to the slab by screws 58. Upper panel 60 is secured to dome 14 by screws 62, and maintains the upper edges of each flexible hinge segment 53 and 54 in a compressed, secured relationship. Mounting panel 60 is curved slightly to flushly abut the upper interior of the roof 14.

An elongated, generally rectangular, flexible skirt 66 is provided at the lower edge of the door slab 50 to help seal the door when in a closed position. Skirt 66 is secured to the slab by an elongated strip 68 secured to the slab by screws 70. As best seen in FIG. 1, skirt 66 will hang downwardly and abut upper partition member 44a to provide a loosely fitting seal when apparatus is closed, in cooperation with the formed angled edges of door slab 50. When the door slab is installed it should be lightly pounded with a rubber mallet to conform its shape to the curved interior of the silo dome.

The dormer door apparatus can be pulled open with linkage cable means 74. The linkage means includes an elongated cable 75 which is strung over pulley assemblies 76a and 76b and which includes an end portion 77 thereof coupled to an eyelet 78 rigidly coupled to slab 50. A handle 79 coupled to the opposite end of the cable is provided for convenient manipulation. Handle 79 may engage a lower J-hook 81 to maintain the door in an open position, or, alternatively, the cable may be loosely wound about a partition or header. A pair of flexible cables or binders 84 including J-hook portions 85 at each end thereof may be strung between eyelets 86, which are secured to the silo chute, and eyelets 87, which are attached to the door, to thereby selectively secure the door in a closed position. To release the door from an open position handle 79 must be disengaged from J-hook 81 and gravity will pull the door downwardly. Afterwards, the operator need merely attach cables 84 to pull the door shut and to secure it in a closed position. It will be appreciated that at this time skirt 66 will automatically overlie partition 44a to provide a loose seal.

When filling the silo the dormer door should be closed to prevent escape of silage into the adjacent discharge chute. The dormer door can quickly be opened to discharge silage from the upper confines of the silo or to vent the silo when not loading or unloading. However, when silage is discharged through the lower silage discharge orifices the dormer door should be shut to prevent or minimize deleterious drafts caused by the chimney effect. Importantly, because of the disclosed construction of the dormer door apparatus, the farmer can quickly and conveniently adapt the silo for the situation at hand.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An improved silo assembly, said assembly comprising:
    a vertically upright silo of tubular configuration;
    a plurality of vertically spaced apart discharge orifices provided in said silo through which silage may be discharged;
    an elongated, generally U-shaped chute extending vertically upwardly along said silo in overlying relationship with respect to said discharge orifices;
    means for defining an access passageway and a separate silage discharge passageway within said chute;
    means for selectively permitting passage of discharged silage from said silo to said separate silage discharge passageway; and
    dormer door means mounted in the top of said silo and comprising a slab portion overlying a predefined orifice above the uppermost one of said discharge orifices communicating with the top of said chute, compliant hinge means pivotally mounting said door slab means interiorly of said silo and for sealing same, and linkage means attached to said slab and having an actuating portion thereon extending into said access passageway for facilitating selective opening of said door means from a position within said access passageway.

2. The combination as defined in claim 1 wherein said dormer door linkage means comprises a cable anchored to said slab, handle means attached to said cable at an opposite end thereof within said access passageway, pulley means for suspending said cable, and hook means on said chute for selectively engaging said handle means to maintain said dormer door means in an open position.

3. The combination as defined in claim 2 including resilient skirt means attached to a lower edge of said door slab means for sealing same against the bottom of said predetermined orifice in the interior of said silo when said door is closed.

4. The combination as defined in claim 3 including binder means within said access passageway for selectively securing said dormer door means in a closed position.

* * * * *